United States Patent [19]

Lumsden

[11] 4,059,521

[45] Nov. 22, 1977

[54] SEWAGE PURIFICATION SYSTEM

[76] Inventor: Roy W. Lumsden, 13355 Granada, Houston, Tex. 77015

[21] Appl. No.: 642,377

[22] Filed: Dec. 19, 1975

[51] Int. Cl.² ........................... C02B 1/34; C02C 1/12
[52] U.S. Cl. ................... 210/195 S; 210/202; 210/220; 210/262; 210/532 S
[58] Field of Search ........................ 210/4–7, 210/14, 15, 170, 195 S, 197, 202, 220, 221 R, 532 S, 262

[56] References Cited

U.S. PATENT DOCUMENTS

| | | | |
|---|---|---|---|
| 2,065,123 | 12/1936 | Downes | 210/4 |
| 2,382,010 | 8/1945 | Hodges | 210/15 X |
| 2,782,604 | 2/1957 | Mixon | 210/532 S |
| 3,264,213 | 8/1966 | Pav et al. | 210/15 X |
| 3,400,822 | 9/1968 | McKeown | 210/197 X |
| 3,560,376 | 2/1971 | Heil | 210/7 |
| 3,607,735 | 9/1971 | Hover et al. | 210/7 |
| 3,834,536 | 9/1974 | Kelsey | 210/220 X |
| 3,850,808 | 11/1974 | Hoermann | 210/197 X |
| 3,859,215 | 1/1975 | Milne | 210/170 |

FOREIGN PATENT DOCUMENTS

| | | | |
|---|---|---|---|
| 2,457,177 | 7/1975 | Germany | 210/170 |

*Primary Examiner*—Wilbur L. Bascomb, Jr.
*Assistant Examiner*—Robert H. Spitzer
*Attorney, Agent, or Firm*—Raphael Semmes

[57] ABSTRACT

A sewage purification system for purifying liquid sewage containing biologically degradable solid waste material. The sewage is subjected to successive treatment steps in three basic consecutive stages during which the sewage is agitated to break up the solid waste material and encourage the proliferation of microorganisms for the digestion thereof, settled to effect separation of the purified liquid component from the residual solid waste material in suspension component with recycling of the latter, and thereafter distributed into the ground.

10 Claims, 9 Drawing Figures

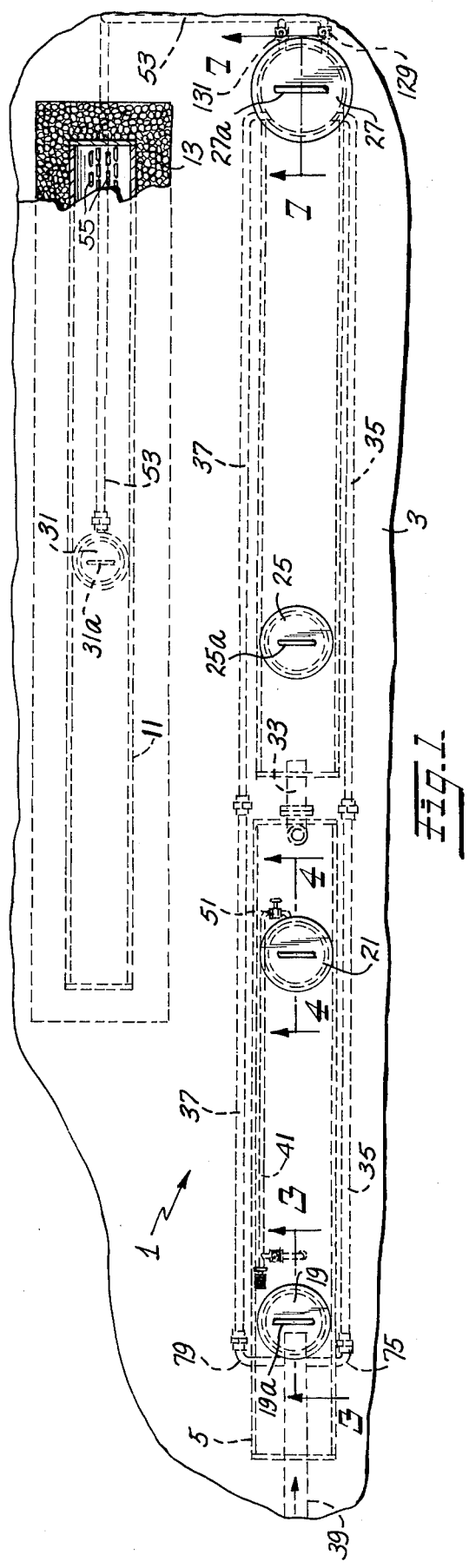
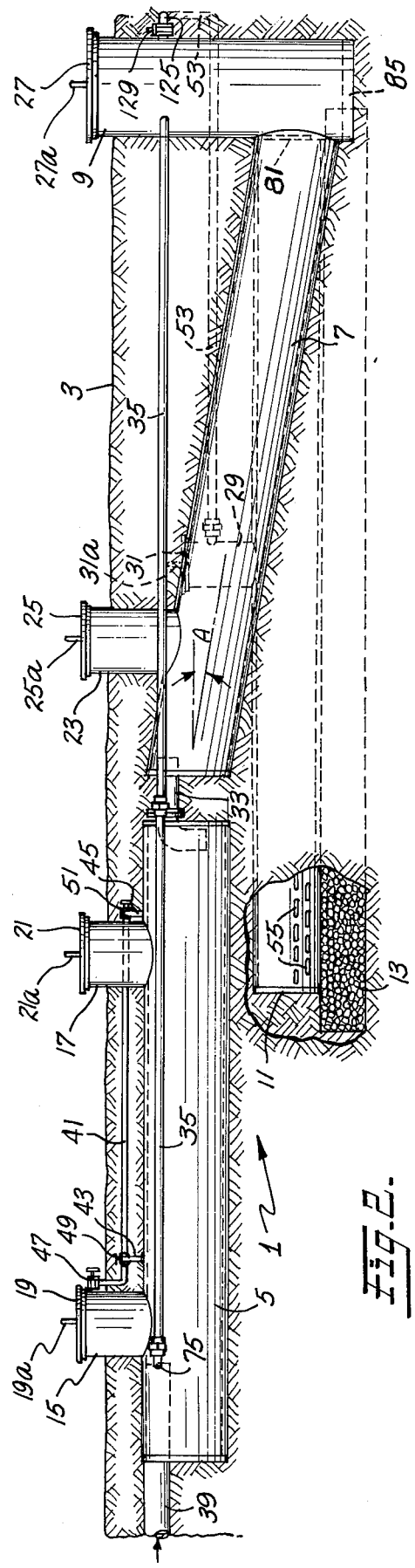

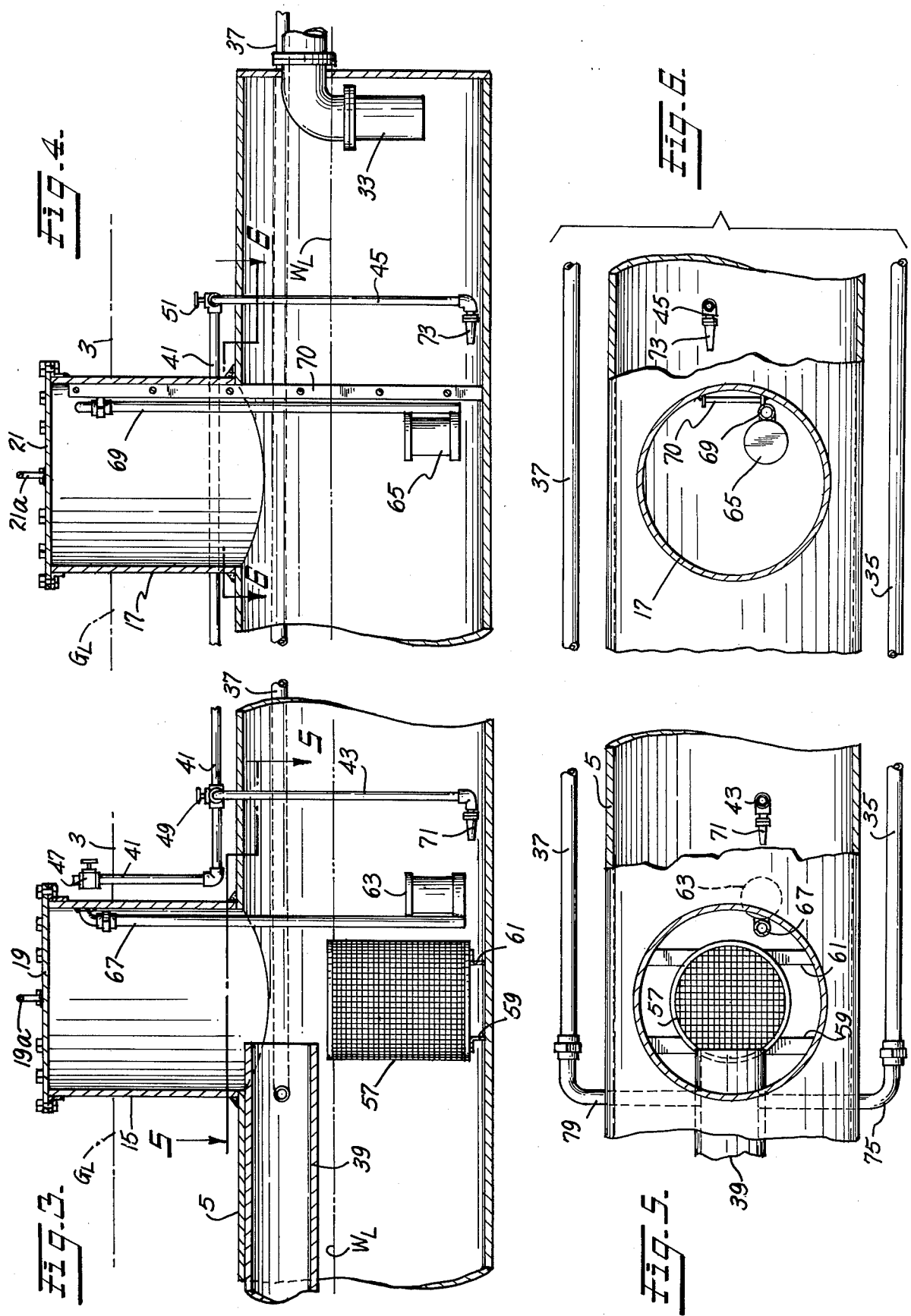

SEWAGE PURIFICATION SYSTEM

BACKGROUND OF THE INVENTION

1. Field of the Invention

The present invention relates generally to the treatment of sewage. More particularly, the present invention relates to the field of prior art dealing with the purification of housing and industrial liquid sewage containing biologically degradable solid waste material and the disposal of the purified sewage.

2. Description of the Prior Art

The situation of housing and industrial waste or sewage disposal has always been a continuous and increasing problem. This is due to our rapidly expanding population and resulting industrial output to accommodate the consumption demand imposed by this growth. Inevitably, compromises have been resorted to in order to provide for the basic needs of the population. Such compromises, particularly in the area of sewage disposal, have exacted their toll from the delicate ecological balance of nature. With each large urban area desperately attempting to dispose of thousands of tons of solid and millions of gallons of liquid sewage every day, it is apparent why large land disposal areas as well as rivers and streams adjacent such cities are presently polluted and deemed unsafe.

The basic prior art sewage treatment system normally involves conducting raw sewage from a population area through long conduits to a place that is distant from this area. This place is basically the sewage treatment facility wherein the sewage is placed within large open containers in order to encourage the proliferation of aerobic bacteria for the digestion of the sewage by converting organic material contained therein into simpler chemical compounds. This conversion is effected through the action of enzymes produced by the living organisms. However, as this process continues, odoriferous gases contained in the sewage are formed by decomposition. Therefore, both the odor and unsightly appearance of such sewage treatment facilities have greatly limited their location and applicability, particularly with respect to densely populated urban areas. This problem obviously increases with population growth since remote areas of sewage treatment facilities become less available. In order to accommodate this situation, great expense must normally be resorted to in order that the sewage can effectively be disposed of while still maintaining a balance between the needs of nature as well as those of the population.

The prior art is replete with various forms of sewage treatment and disposal systems. Some are quite simple, being based generally upon the cesspool principle wherein sewage is caused to freely drain into and distribute within the ground. Other, more involved systems, propose a combination of chemical and physical treatment prior to disposing of the treated sewage. Still more complicated systems necessitate the use of large scale facilities for subjecting the sewage to multiple stages of treatment above ground level prior to the disposal of the treated sewage into the natural waterways.

Because of various factors, including cost of construction, output capacity, complexity of operation and adaptation to populated areas, prior art sewage treatment and disposal systems have not heretofore satisfactorily met the many demands and needs of both housing and industry.

SUMMARY OF THE INVENTION

It is therefore an object of the present invention to provide a sewage purification system which is both simple in operation and economical to construct.

It is another object of the present invention to provide for a sewage purification system which is capable of high output capacities.

It is yet another object of the present invention to provide for a sewage purification system which can be utilized for treating both housing and industrial sewage in a manner acceptable to the needs of population and industry.

It is still yet another object of the present invention to provide for a sewage purification system which is both odor free and inobtrusive.

It is yet a further object of the present invention to provide for a sewage purification system which operates to efficiently purify sewage in a natural manner without the use of chemicals or synthetic treatment agents thereby helping to maintain ecological balance.

The present invention serves to overcome the disadvantages of prior art systems and achieve the foregoing objects by providing for the purification of liquid sewage containing biologically degradable solid waste material in a basic three stage manner. The first stage of treatment includes passing the raw sewage into an elongate tank in which the sewage is subjected to both filtration and agitation. The filtration serves to remove indissolvable debris, such as metals and plastics, and other non-biological waste materials which are incapable of being placed into liquid suspension. The agitation serves to break up the solids and promote the proliferation of microorganisms in the form of aerobic bacteria for digesting the sewage. The filtered and agitated sewage is then passed into a second elongate tank that is disposed in a declined manner with respect to the first tank so that the sewage may be caused to settle into a purified liquid component and a residual solids in suspension component. A collection tank at the lower end of the second tank serves to separate the purified liquid from the residual solid waste material in suspension. The latter is recycled back to the first tank for re-treatment and the purified liquid is passed to a third elongate tank having perforations in its wall section for distributing the liquid into the ground. The entire system is buried below ground level except for at least one access manhole extending above ground level from some of the tanks for inspection and servicing purposes.

Other objects, features and advantages of the present invention will be apparent from the following description of preferred embodiments thereof, with reference to the accompanying drawings, which form a part of this specification, wherein like reference characters designate corresponding parts of the several views.

BRIEF DESCRIPTION OF THE DRAWINGS

FIG. 1 is a fragmentary plan view of the sewage purification system of the present invention;

FIG. 2 is a fragmentary side elevational view, showing the disposition of the sewage purification system of the present invention in its environment of use below ground level;

FIG. 3 is an enlarged fragmentary vertical sectional view, taken on the line 3—3 of FIG. 1;

FIG. 4 is a fragmentary vertical sectional view, taken on the line 4—4 of FIG. 1;

FIG. 5 is a fragmentary horizontal sectional view taken on the line 5—5 of FIG. 3;

FIG. 6 is a fragmentary horizontal sectional view, taken on the line 6—6 of FIG. 4;

FIG. 9 is a fragmentary vertical sectional view taken on the line 9—9 of FIG. 7.

DETAILED DESCRIPTION OF THE PREFERRED EMBODIMENTS

Figure 7:
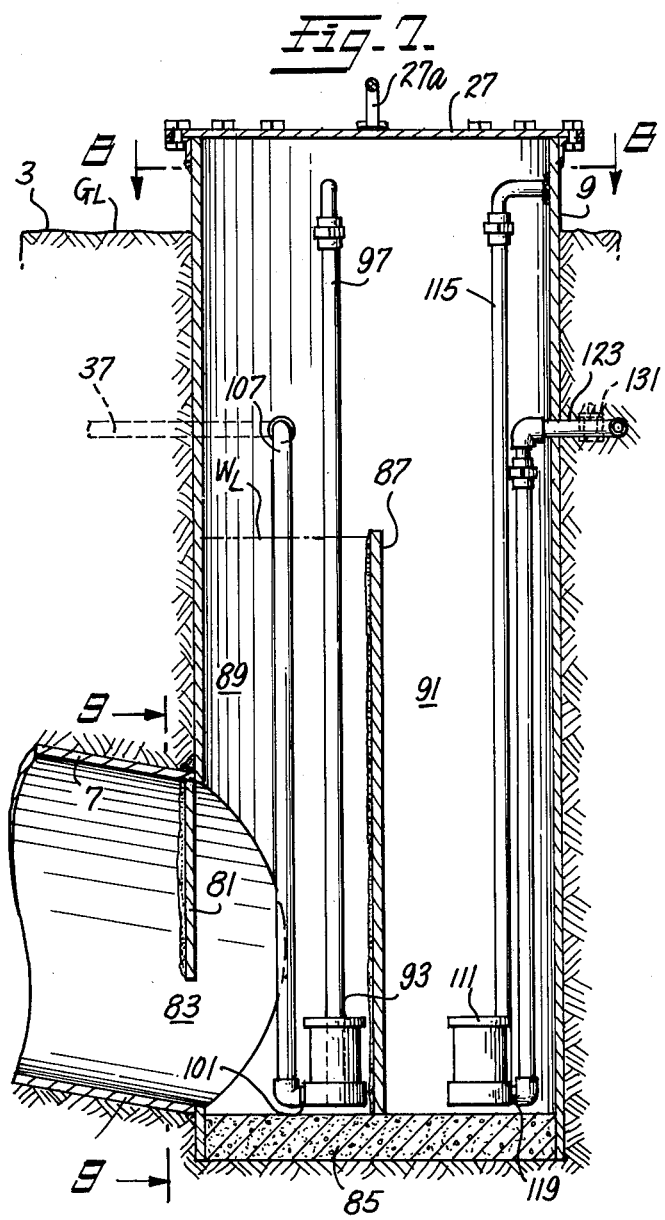
FIG. 7 is an enlarged fragmentary vertical sectional view, taken on the line 7—7 of FIG. 1.

Referring now to FIGS. 1 and 2, a sewage purification system of the present invention, indicated generally at 1, is shown in its intended environment of use buried below ground level 3. System 1 basically comprises three treatment stages.

The first stage includes a first elongate tank 5 disposed with its longitudinal axis substantially horizontal with respect to ground level 3. The second stage comprises a second elongate tank 7 in fluid communication with first tank 5 and disposed with its longitudinal axis declined at an angle, indicated generally at A, with respect to the longitudinal axis of first tank 5. Angle A may preferably be approximately 10°. A collection tank 9 is disposed at the lower end of tank 7 in fluid communication therewith. The third stage includes a third elongate tank 11 for receiving purified sewage from collection tank 9 of the second stage for distribution into the ground through a porous bed 13 upon which third tank 11 is supported. Elongate tanks 5, 7 and 11, as well as collection tank 9, may preferably be of generally cylindrical configuration.

First tank 5 may be provided with a pair of upwardly extending access casings 15 and 17 which include a pair of removable covers 19 and 21, having handles 19a and 21a for permitting access into the interior of first tank 5 from above ground level 3 for inspecting, testing or servicing purposes. Similarly, second tank 7 may also be provided with an upwardly extending casing 23 and an associated removable cover 25 having a handle 25a for gaining access therein. Collection tank 9 is preferably disposed with its longitudinal axis in a vertical position so that access therein can be achieved by extending the upper portion of tank 9 above ground level and closing the exposed end thereof by means of a removable cover 27 having a handle 27a. Because third tank 11 constitutes the ultimate collection and disposition stage for the sewage purified by system 1, it is preferable that access into third tank 11 be limited by means of an upwardly extending casing 29 which terminates below ground level 3. A removable cover 31 having a handle 31a may be provided for gaining access into casing 29 after a sufficient portion of the soil comprising ground 3 has been removed from directly thereabove.

First tank 5 may be placed in fluid communication with second tank 7 through a right-angle elbow connection 33. A pair of conduits 35 and 37 permit recycling of sewage from collection tank 9 back to first tank 5. Raw sewage is received into first tank 5 through an input conduit 39. An air injection line 41 is provided adjacent first tank 5 for feeding compressed air therein through lines 43 and 45. A connection valve 47 permits line 41 to be joined to a source of compressed air (not shown). A pair of control valves 49 and 51 permit the adjustment of compressed air flow through lines 43 and 45, respectively.

Purified sewage from collection tank 9 is fed into third tank 11 through a conduit 53 which is preferably joined to tank 11 at its casing 29. As more clearly seen in FIG. 2, purified sewage received within third tank 11 is distributed or drained into the ground through porous bed 13. This is accomplished through a plurality of perforations 55 provided along the lower longitudinal wall section of tank 11. Porous bed 13 may comprise stones, gravel or any other materials well known in the art and suitable for the purpose of receiving and distributing purified liquid sewage.

The structural details of first tank 5 shall now be described in detail with reference to FIGS. 3 through 6. A filter means 57 is disposed directly beneath the opening of sewage input conduit 39 for the purpose of initially removing debris, such as plastic and metal wastes, which is incapable of being dissolved or placed into suspension in the liquid component of the sewage. Filter 57 may take the form of a removable basket which is supported in a spaced manner from the bottom of tank 5 by means of a pair of rails 59 and 61. A pair of submersible pumps 63 and 65 are supported within tank 5 by means of a pair of tubular pipes 67 and 69, respectively. Pipes 67 and 69 are secured to the internal surface of casings 15 and 17 and are hollow to support the necessary electrical connections (not shown) to pumps 63 and 65. It is to be understood that pumps 63 and 65 may be any type of submersible pump well known in the art and capable of pumping and agitating the liquid within which it is submerged. A ladder 70 may be provided in casing 17, as well as other casings in system 1, to facilitate access into elongate tank 5.

Compressed air feed lines 43 and 45 extend transversely within tank 5 and terminate adjacent the bottom thereof. A jet nozzle 71 is provided at the end of line 43 and directed at a right angle with respect thereto. Similarly, a right angled jet nozzle 73 is also provided at the end of line 45. The dual action of pumps 63 and 65, in conjunction with aeration produced by nozzles 71 and 73, create a cumulative strong agitating force which serves to impart a spiraling motion to the liquid sewage along the longitudinal axis of tank 5. It is preferable to locate casings 15 and 17 substantially adjacent the opposite ends of tank 5 in order that complete agitation of the liquid sewage contained therein may be effectively produced by pumps 63 and 65 and aeration jets 71 and 73. As seen in FIGS. 3 and 4, the working liquid sewage level, generally designated as WL, is approximately level with the upper end of filter 57. Elbow conduit 33 is disposed to receive the agitated sewage through its input opening at a level significantly below the working liquid level WL in tank 5.

Referring more particularly to FIGS. 5 and 6, it can be seen that recycle lines 35 and 37 are disposed substantially parallel with the longitudinal axis of tank 5 and are placed in communication with the interior thereof through a pair of elbow joints 75 and 79, respectively. The output ends of elbows 75 and 79 are joined in communication with the interior of feed conduit 39 such that recycled sewage brought back by lines 35 and 37 is caused to intermix with the incoming sewage from conduit 39 for refiltering in filter 57.

Figure 8:
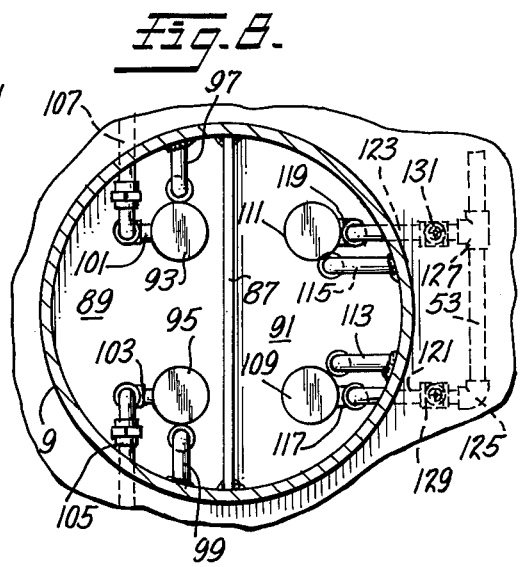
FIG. 8 is a fragmentary horizontal sectional view, taken on the line 8—8 of FIG. 7.
Figure 8:
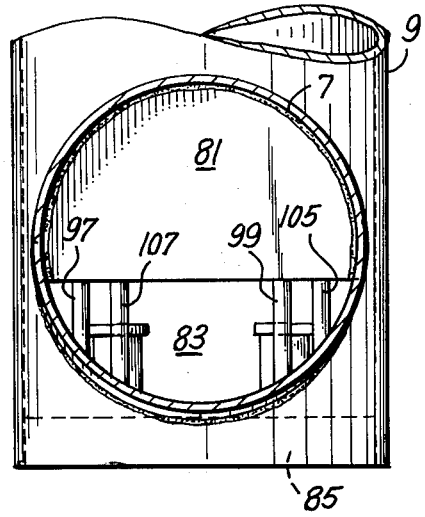

The lower end structure of second tank 7, including collection tank 9, shall now be described in detail with reference to FIGS. 7 through 9. As previously indicated and shown to advantage in FIG. 2, second tank 7 is disposed in a declined manner with respect to substantially horizontal first tank 5. The lower end of second tank 7 is secured to the lower portion of collection tank 9 for fluid transfer and communication therewith. A downwardly depending baffle 81 is carried by the upper internal wall section at the lowermost end of second tank 7 in order to close off substantially half of the opening at the end of tank 7 and form a limited transverse opening 83 therewith. This is more clearly shown in FIG. 9. Because of baffle 81, agitated sewage received from first tank 5 through elbow conduit 33 is caused to accumulate within second tank 7 and exit therefrom at a rate controlled by the size of opening 83. Accordingly, the agitated sewage accumulated in second tank 7, and prior to its ultimate removal through opening 83, is caused to settle within tank 7 so that a liquid component will rise above a heavier residual solids in liquid suspension component.

Collection tank 9 is of a substantially cylindrical configuration with a vertically disposed longitudinal axis. The lower end of tank 9 may be provided with a seal or plug 85 in the form of a concrete slab or any other well known material deemed suitable for the environment within which tank 9 is to be subjected. A weir 87 is provided within tank 9 and extends from the bottom thereof upwardly to divide substantially half of the volume of tank 9 into two substantially equal semi-cylindrical compartments 89 and 91. Settled sewage received from opening 83 at the lower end of second tank 7 is passed into first compartment 89. A pair of submersible pumps 93 and 95 are disposed adjacent the bottom of compartment 89 and supported therein by pipes 97 and 99, respectively. Suitable electrical connection means (not shown) are provided within support pipes 97 and 99 to supply power for operating pumps 93 and 95. Pump 93 is provided with an output 101 and pump 95 is also provided with a similar output 103. Both outputs 101 and 103 are joined to recycle lines 37 and 35, respectively, through a pair of conduits 105 and 107. Disposed within second compartment 91 and adjacent the bottom thereof are a pair of submersible pumps 109 and 111 which are supported by conduits 113 and 115 for carrying suitable electrical connection means (not shown) for operating pumps 109 and 111, respectively. Pump 109 may be disposed higher than pump 111, or vice versa, in order to better control the rate of liquid removal from compartment 91. An output 117 of pump 109 and an output 119 of pump 111 are, respectively, connected to conduits 121 and 123. Conduit 121 may be joined to conduit 53 by an elbow connection 125 while conduit 123 may also be joined to conduit 53 through a tee connection 127. A control valve 129 may be disposed in conduit 121 for controlling flow therethrough to conduit 53. Similarly, a control valve 131 may be disposed in conduit 123 for controlling flow therethrough to conduit 53. As seen in FIGS. 1 and 2, conduit 53 conveys purified sewage from conduits 121 and 123 to third tank 11 through casing 29.

It is to be understood that the system of the invention may be practiced by necessary alterations and adaptations as to sizes of components utilized in order to conform the system for a given environment of use or required processing capacity. A specific example for a system of the present invention will now be detailed, but it is to be understood that this example is in no way limitative of the flexibility of the invention.

In a typical installation of the invention for the handling and purification of the waste and sewage for approximately 2000 people in a housing project, first elongate tank 5 and second elongate tank 7 are both of cylindrical configuration having a diameter of approximately 4 feet, a length of about 30 feet and a capacity of approximately 2800 gallons. Third tank 11 is also of cylindrical configuration having a diameter of about 3 feet and an overall length of approximately 40 feet. Porous bed 13 may comprise gravel having a depth of preferably 2 feet, a width of 5 feet and a length of 40 feet. Collection tank 9 is of cylindrical configuration having a diameter of about 54 inches and a height of approximately 12 feet.

Decline angle A of second tank 7 is preferably 8°, 52 minutes with respect to the horizontal longitudinal axis of first tank 5. The uppermost outer cylindrical wall surface of first tank 5 is buried approximately 2 feet below ground level 3. Accordingly, the lowermost outer wall portion of the lower end of second tank 7, at its junction with collection tank 9, is disposed approximately 6 inches from the bottom of concrete plug or seal 85, the latter being effectively about 6 inches thick. Access casings 15, 17 and 23 are preferably about 30 inches in diameter with their corresponding covers 19, 21 and 25 being of ⅜ inch metal plate having an outside diameter of approximately 3 feet. Similarly, cover 27 of collection tank 9 is also fabricated from ⅜ inch metal plate with an outside diameter of about 58 inches. Casing 29 of third tank 11 is about 2 feet in diameter and having a correspondingly sized cover 31 of ⅜ inch metal plate.

Line 53 conducting purified sewage from collection tank 9 to third tank 11 and recycle lines 35 and 37 are advantageously made from 2 inch pipe. Compressed air line 41 and feeder lines 43 and 45 are preferably pipe having a 1 inch diameter. Sewage input conduit 39 is 12 inches in diameter and elbow connection 33 is preferably of 8 inch diameter pipe. Further, the input opening of elbow 33 is spaced about 8 inches off of the lowermost internal wall section of first tank 5.

Baffle 81 at the lower end of second tank 7 depends downwardly for about 2½ feet from the uppermost point of the internal wall portion of second tank 7. Submersible pumps 63, 65, 93, 95, 109 and 111 are of ½ horsepower, 110 volt-type, each having a pumping capacity of approximately 3500 gallons per hour. Support conduits 67, 69, 97, 99, 113 and 115 are preferably of 2 inch diameter pipe, thereby providing ample space for the necessary electrical wire connections to the respective pumps supported thereby.

MODE OF OPERATION

The manner in which liquid sewage containing biologically degradable waste material is purified by the sewage purification system of the present invention shall now be described in detail. Raw sewage is fed into system 1 through feed input conduit 39 and caused to immediately pass through filter 57 for preliminary removal of debris, such as plastic and metallic materials, which is incapable of being either completely dissolved in the liquid component of the sewage or placed in suspension therewith. The filtered liquid sewage containing biologically degradable solid waste is then caused to fill up tank 5 up to the working liquid level WL. Pumps 63 and 64 are then actuated and compressed air is injected into the liquid sewage through aeration nozzles 71 and 73. The combined agitation forces created by pumps 63 and 65 and aeration jets 71 and 73 causes the liquid sewage to move in a spiraling motion along the longitudinal axis of tank 5, thereby breaking up the solid waste matter contained therein.

Further, the injection of air through jets 71 and 73 encourages the proliferation of aerobic bacteria for the digestion of the sewage by converting the organic material contained therein into simpler chemical compounds through the action of enzymes produced by the living organisms. The agitated and aerated sewage is then passed from first tank 5 through elbow conduit 33 into second tank 7 in which it passes downwardly along the declined disposition of the latter tank. Because baffle 81 restricts the passage of sewage from tank 7 to a rate controlled by the size of opening 83, the sewage is caused to settle within tank 7 so that a purified liquid component preliminarily separates from a residual solid waste in liquid suspension component. The settled sewage is then passed through opening 83 at a rate also controlled by pumps 93 and 95 and enters first compartment 89 of collection tank 9. The purified liquid component begins to rise within compartment 89 until it overflows the top of weir 87 into second compartment 91. Pumps 93 and 95 immediately remove the residual solid waste in liquid suspension component, which component effectively settles or separates to the lower portion of compartment 89, and passes this component out through conduits 105 and 107 and into recycle lines 35 and 37 through which the recycled sewage is brought back to input feed conduit 39 for refiltering and reprocessing. The purified liquid component of the sewage is removed from second compartment 91 through the action of pumps 109 and 111 which passes the liquid up through lines 121 and 123 to merge into common line 53. The purified liquid is conducted along line 53 to third tank 11 from which it is distributed through perforations 55 provided at the lower portion thereof for ultimate drainage into porous bed 13 upon which third tank 11 is supported. Liquid sewage drained into porous bed 13 is subsequently received into the ground therebelow.

As is apparent, the present invention provides a system for purifying sewage in a natural manner without the need or use of chemicals or synthetic treatment agents. By varying the size of the individual components used in the system, the quantity and rate of sewage purified thereby can be advantageously controlled according to the needs of any given installation. Because the system is preferably intended for installation and use below ground level, the usual disadvantages of odors and obtrusiveness are eliminated. Maintenance of the entire system is easily effected through the several casings which provide visual and physical access into the several stages.

The present system may also be modified for automatic operation. For example, by including an additional weir, relief valve and sealing the casings in the first tank, the methane gas created by the agitation of the sewage therein can be utilized to operate small engines which in turn can furnish the electric power for operating the overall system.

It is to be understood that the forms of the invention herewith shown and described are to be taken as preferred embodiments of the same, and that various changes in the shape, size and arrangement of parts may be resorted to, without departing from the spirit of the invention or scope of the sub-joined claims.

I claim:

1. An apparatus for purifying untreated liquid sewage containing biologically degradable solid waste material, which apparatus comprises, in combination:

A. means for feeding said untreated sewage into a first substantially closed elongate tank having a substantially horizontal axis and means for agitating and separate means for aerating the sewage in said tank to effect almost complete digestion thereof, B. a second substantially closed elongate tank having a generally horizontal longitudinal axis declined with respect to the longitudinal axis of the first tank for receiving the treated sewage from the first tank and for settling the treated sewage, C. a substantially closed collection tank disposed at the lower end of the second tank for receiving the settled sewage from the lower end of the second tank and for separating the settled sewage into a purified liquid component and a residual solid waste material in suspension component, D. a recycle means for recycling the residual solid waste material in suspension component back to the first tank, and E. a substantially closed third elongate tank for receiving and distributing the purified liquid component into the ground.

2. The apparatus of claim 1 wherein the first tank further includes means for filtering the sewage.

3. The apparatus of claim 1 wherein the recycle means includes:

A. conduit means disposed between the first tank and the collection tank, and

B. pump means for delivering the residual solid waste material in suspension from the collection tank to the first tank through the conduit means.

4. The apparatus of claim 1 wherein the third tank is supported on a porous bed and is further provided with a plurality of perforations along a longitudinal wall section thereof for permitting the purified liquid to drain therethrough into the porous bed.

5. The apparatus of claim 1 wherein the first, second and third elongate tanks each include at least one access chamber extending vertically from the upper portion thereof.

6. The apparatus of claim 1 wherein the first, second and third elongate tanks each have a generally cylindrical configuration.

7. The apparatus of claim 1 wherein the lower end of the second tank further includes a baffle plate for controlling the flow of settled sewage from the second tank into the lower end of the collection tank.

8. The apparatus of claim 1 wherein the longitudinal axis of the second tank is declined at an angle of approximately 10° with respect to the longitudinal axis of the first tank.

9. An apparatus for purifying untreated liquid sewage containing biologically degradable solid waste material, which apparatus comprises in combination:

A. means for feeding said untreated sewage into a first substantially closed elongate tank having a substantially horizontal axis and means for agitating the sewage in said tank to impart a spiralling motion to the sewage along the horizontal axis of the first tank, said means for agitating including a pump for circulating the sewage and an aeration jet for directing compressed air into the sewage, B. a second substantially closed elongate tank having a generally horizontal longitudinal axis declined with respect to the longitudinal axis of the first tank for receiving the agitated sewage from the first tank and for settling the agitated sewage, C. a substantially closed collection tank disposed at the lower end of the second tank for receiving the settled sewage from the lower end of the second tank and for separating the settled sewage into a purified liquid component and a residual solid waste material in suspension component, D. recycle means for recycling the residual solid waste material in suspension component back to the first tank, and E. a substantially closed third elongate tank for receiving and distributing the purified liquid component into the ground.

10. An apparatus for purifying untreated liquid sewage containing biologically degradable solid waste material, which apparatus comprises in combination:

A. means for feeding said untreated sewage into a first substantially closed elongate tank having a substantially horizontal axis and means for agitating the sewage in said tank, B. a second substantially closed elongate tank having a generally horizontal longitudinal axis declined with respect to the longitudinal axis of the first tank for receiving the agitated sewage from the first tank and for settling the agitated sewage, C. a substantially closed collection tank disposed at the lower end of the second tank for receiving the settled sewage from the lower end of the second tank and for separating the settled sewage into a purified liquid component and a residual solid waste material in suspension component, said collection tank being of an elongate configuration having a vertical longitudinal axis and a vertical weir plate partially dividing the tank into two sections, said collection tank receiving said settled sewage at the lower end thereof substantially below the top of said weir plate, D. recycle means for recycling the residual solid waste material in suspension component back to the first tank, and E. a substantially closed third elongate tank for receiving and distributing the purified liquid component into the ground.

* * * * *